(12) United States Patent
Serstad et al.

(10) Patent No.: US 12,194,501 B2
(45) Date of Patent: Jan. 14, 2025

(54) LOGICAL RELOCATION OF SORT DESTINATIONS

(71) Applicant: Tompkins Robotics, Inc., Orlando, FL (US)

(72) Inventors: James M. Serstad, Orlando, FL (US); Michael C. Futch, Orlando, FL (US)

(73) Assignee: Tompkins Robotics, Inc., Orlando, FL (US)

( * ) Notice: Subject to any disclaimer, the term of this patent is extended or adjusted under 35 U.S.C. 154(b) by 0 days.

(21) Appl. No.: 18/406,885

(22) Filed: Jan. 8, 2024

(65) Prior Publication Data

US 2024/0390944 A1    Nov. 28, 2024

Related U.S. Application Data

(63) Continuation of application No. 18/321,171, filed on May 22, 2023, now Pat. No. 11,878,325.

(51) Int. Cl.

| | |
|---|---|
| *B07C 3/00* | (2006.01) |
| *B07C 3/18* | (2006.01) |
| *B65G 47/46* | (2006.01) |
| *B65G 47/50* | (2006.01) |
| *G06Q 10/087* | (2023.01) |

(52) U.S. Cl.
CPC .............. *B07C 3/003* (2013.01); *B07C 3/008* (2013.01); *B07C 3/18* (2013.01); *B65G 47/46* (2013.01); *B65G 47/50* (2013.01); *G06Q 10/087* (2013.01)

(58) Field of Classification Search
CPC ........... B07C 3/003; B07C 3/008; B07C 3/18; B65G 47/46; B65G 47/50; G06Q 10/087
See application file for complete search history.

(56) References Cited

U.S. PATENT DOCUMENTS

| | | | |
|---|---|---|---|
| 466,904 A | | 1/1892 | Fein |
| 467,228 A | | 1/1892 | Gosnell et al. |
| 543,449 A | | 7/1895 | Miller |
| 602,853 A | | 4/1898 | Jump |
| 862,219 A | | 8/1907 | Updegraff |
| 11,878,325 B1 | * | 1/2024 | Serstad ................... B07C 3/008 |
| 2020/0047218 A1 | | 2/2020 | Cherry et al. |
| 2022/0126325 A1 | | 4/2022 | Mutarelli et al. |

FOREIGN PATENT DOCUMENTS

| | | |
|---|---|---|
| JP | 2019531887 | 11/2019 |
| JP | 202347031 A | 4/2023 |
| WO | 2023049948 A1 | 4/2023 |

* cited by examiner

*Primary Examiner* — James R Bidwell
(74) *Attorney, Agent, or Firm* — Parthiban A Mathavan

(57) ABSTRACT

System for use in directing a sorting operation comprises a server, a receptacle logical destination identification (ID) assignment engine, a plurality of receptacles, and an automated transport device for transporting and depositing articles into the receptacles. The system is configured to: assign a first logical destination ID to a first receptacle; and direct an automated transport device to transport and deposit a first article into the first receptacle associated with the first logical destination ID. The system is further configured to: determine that the first receptacle is full; re-assign the first logical destination ID to a second receptacle; and re-direct the automated transport device to transport and deposit the first article into the second receptacle associated with the first logical destination ID.

20 Claims, 6 Drawing Sheets

LOGICAL RELOCATION OF SORT DESTINATIONS

TECHNICAL FIELD

This invention relates generally to the field of warehouse automation, and particularly to systems and methods for sorting articles with automated devices.

BACKGROUND

An article sorting system operates to sort articles to destinations, each destination typically represented by a receptacle. When a receptacle becomes full or when an order being sorted to that destination receptacle has been completed, that destination receptacle needs to be removed and replaced with an empty receptacle. A necessary limitation of this process is that there is a certain time interval required for the exchange of the destination receptacle to occur, and during that time, that particular destination undergoing the exchange process is unusable. The time required to replace a full or complete receptacle impacts the throughput and efficiency of article sorting system, with the replacement time needed being impacted by whether the replacement is performed manually or by an automated process involving a robot or other automated machine.

Accordingly, opportunities exist for improving the throughput of an article sorting system by optimizing the receptacle replacement process.

SUMMARY OF INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more embodiments, a system for use in directing a sorting operation is provided. The system may include a server comprising a memory, a processor, and a receptacle logical destination identification (ID) assignment engine. The system may further include a plurality of receptacles; and one or more automated transport devices for transporting and depositing articles into the receptacles. The system is configured to: assign a first logical destination ID to a first receptacle; and direct an automated transport device to transport and deposit a first article into the first receptacle associated with the first logical destination ID.

According to one or more embodiments, the system is further configured to: determine that the first receptacle is full; re-assign the first logical destination ID to a second receptacle; and re-direct the automated transport device to transport and deposit the first article into the second receptacle associated with the first logical destination ID.

According to one or more embodiments, the system is further configured to: determine that the first receptacle is located beyond a predetermined distance from an article induction point; re-assign the first logical destination ID to a second receptacle, wherein the second receptacle is located within the predetermined distance from the article induction point; and redirect the automated transport device to transport and deposit the first article into the second receptacle associated with the first logical destination ID.

According to one or more embodiments, the system is further configured to: determine that the first receptacle is located beyond a predetermined distance from an article induction point; re-assign the first logical destination ID to a second receptacle, the second receptacle representing a receptacle determined by the system to be available for assignment that is located nearest to the article induction point; and redirect the automated transport device to transport and deposit the first article into the second receptacle associated with the first logical destination ID.

According to one or more embodiments, the automated transport device is an automated mobile robot (AMR) or a computer-controlled vehicle. According to one or more embodiments, the server is configured to re-route the automated transport device to the second receptacle after the automated transport device commences travel towards the first receptacle. According to one or more embodiments, the second receptacle is located within a predetermined distance from an article induction point. According to one or more embodiments, the server is further configured to direct replacement of the first receptacle. According to one or more embodiments, the server is further configured to receive confirmation of replacement of the first receptacle with an empty receptacle. According to one or more embodiments, the server is in communication with a sensing device configured to sense that the empty receptacle is ready to receive articles. According to one or more embodiments, a robot is configured to transport the first receptacle to a location of further processing. According to one or more embodiments, the first receptacle is removed manually. According to one or more embodiments, the server is in communication with a sensing device configured to sense that the first receptacle is full. According to one or more embodiments, the server is further configured to calculate a total volume of articles delivered by the automated transport device to the first receptacle to determine that the first receptacle is full. According to various embodiments, a count of the physical locations is greater than a count of the logical destination IDs. In one embodiment, a count of the receptacles or a count of physical locations associated with the receptacles is greater than a count of the logical destination IDs. In one embodiment, a count of physical locations associated with the receptacles is greater than a count of the logical destination IDs, wherein a difference between the count of the physical locations and the count of the logical destination IDs is determined based on a time interval required for replacing a full receptacle with an empty receptacle. In one embodiment, the count of receptacles is equal to or greater than the count of physical locations. In at least one embodiment, each physical location corresponds to a physical address to which a group of the sorted articles (that have been sorted, for e.g., to a receptacle or to two or more receptacles in case all articles to be sorted to that specific physical address will not fit onto one receptacle) are to be shipped. Accordingly, it is advantageous for system 501 to include more physical locations than logical destinations rather than to include more receptacles than logical destinations. In one embodiment, a count of the receptacles is greater than a count of the logical destination IDs. According to one or more embodiments, a count of the physical locations is greater than a count of the logical destination IDs, wherein a difference between the count of the physical locations (or the count of receptacles) and the count of the logical destination IDs is determined based on a time interval required for replacing a full receptacle with an empty receptacle. According to one or more embodiments, a sensing device in communication with the server senses that the first receptacle is full. According to one or more embodiments, the transport device traverses one of: a first surface and a track arrangement. According to one or more embodiments, the system is further configured to assign a logical destination ID to each of the plurality of receptacles. According to one or more embodiments, the system further comprises an information acquisition device electronically coupled to the server, wherein the information acquisition device is configured to determine a product type of each article by interacting with each article. According to one or more embodiments, the system is further configured to verify that there is at least one non-full receptacle available for delivery of articles thereto.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION OF THE EMBODIMENTS

Figure 1:
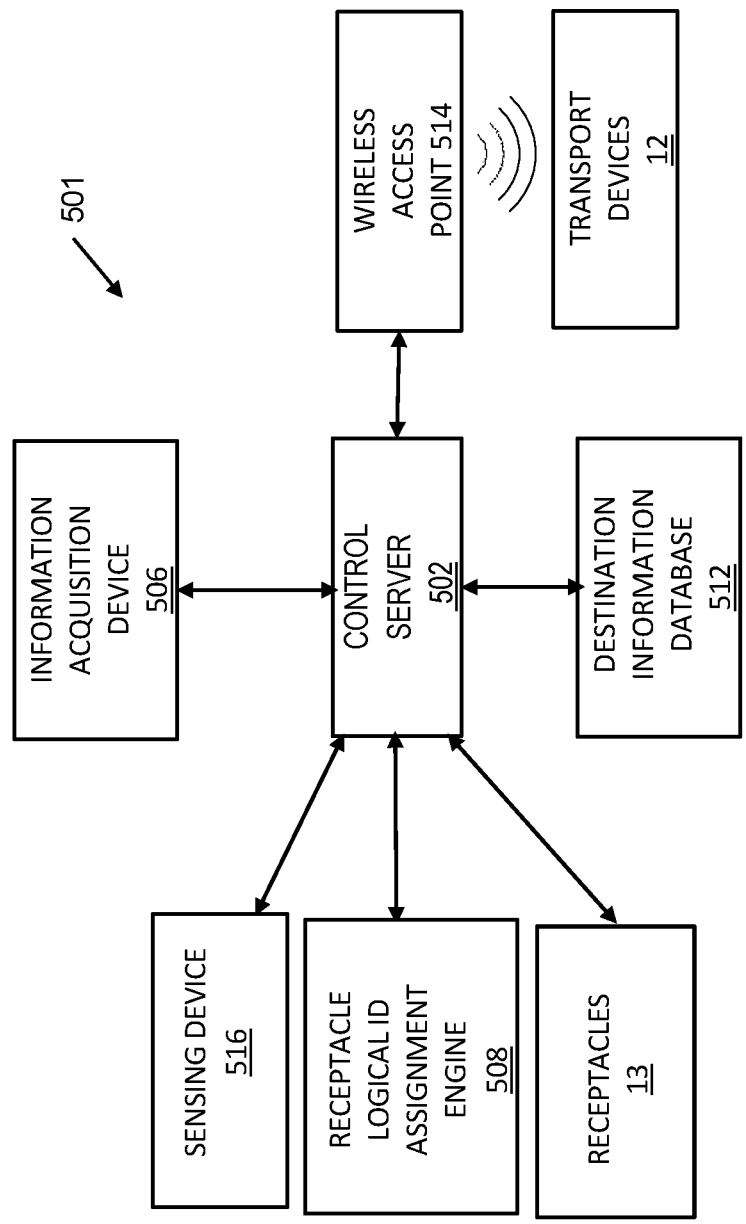
FIG. 1 depicts a block diagram of an exemplary improved sorting system for use with logical relocation of sort destinations, for e.g., when a destination receptacle has become full, according to one or more implementations of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings:

When a receptacle in an article sorting system is full, that receptacle needs to be removed and replaced with an empty receptacle. A necessary limitation of this process is that there is a certain time interval required for the exchange of receptacles to occur, and during that time, the destination of the filled-up receptacle is unusable. The time required to replace a full receptacle impacts the throughput and efficiency of an article sorting system. The replacement time needed may be impacted by whether the replacement is performed manually by a person or in an automated fashion by a robot (e.g., a sorting robot operating on a platform or surface, a pick assist AMR operating on a surface, a pedestal robot operating on a surface) or other similar automated machine. Indeed in some cases, the filled-up receptacle may be removed manually while the replacement receptacle may be put in place by a robot or other automated machine; in some cases, the opposite might happen in that the filled-up receptacle may be removed by a robot or other automated machine while the replacement receptacle may be put in place manually. Whereas a potential solution to reduce the time needed for swapping out a full receptacle with a replacement receptacle is to place empty receptacles next to each destination so that the exchange can be done quickly, such an approach causes wastage of space, requires excess receptacles, and contributes to congestion in the aisles.

Embodiments of the presently disclosed subject matter operate to advantageously overcome the limitations of the art by providing for apparatus, systems and methods to sort articles to logical destinations which may then be assigned to any physical location on the sorter, and when a receptacle at a physical location becomes full, the system operates to immediately re-assign the logical destination associated with a receptacle that was just identified to have become full to another available physical location so that sorting may continue uninterrupted. According to various embodiments, each sorting destination is given a logical location which can be re-assigned to any physical location as and when needed. The system may further be configured to have one or more "spare" or unassigned or available physical locations available at any time.

FIG. 1 depicts a block diagram of an improved article sorting system 501 (hereinafter "system 501") for use with logical relocation of sort destinations, for e.g., when a destination receptacle has become full, according to one or more implementations of the presently disclosed subject matter. According to various embodiments, system 501 is provided for use in directing a sorting operation. System 501 comprises a control server such as server 502. Whereas the terms "system 501" and "server 502" may be used herein interchangeably, it is to be understood that server 502 is a sub-component of system 501. System 501 further comprises receptacle logical destination ID assignment engine such as receptacle logical ID assignment engine 508, receptacles 13, article information acquisition devices 506, destination information database 512, wireless access point 514 and one or more automated transport devices such as transport devices 12. Various components of system 501 are depicted in a representative manner as blocks representing a generic descriptor of the technology. Server 502 comprises, among other components, a memory, a processor, and a receptacle logical destination identification (ID) assignment engine such as receptacle logical ID assignment engine 508, a plurality of receptacles 13. Transport devices 12 are configured for transporting and depositing articles into receptacles 13. Receptacle 13 includes assigned receptacles 14 and unassigned receptacles 15, filled up receptacles such as full receptacles 16, and replacement receptacles 18 that replace full receptacles 16.

Figure 2C:
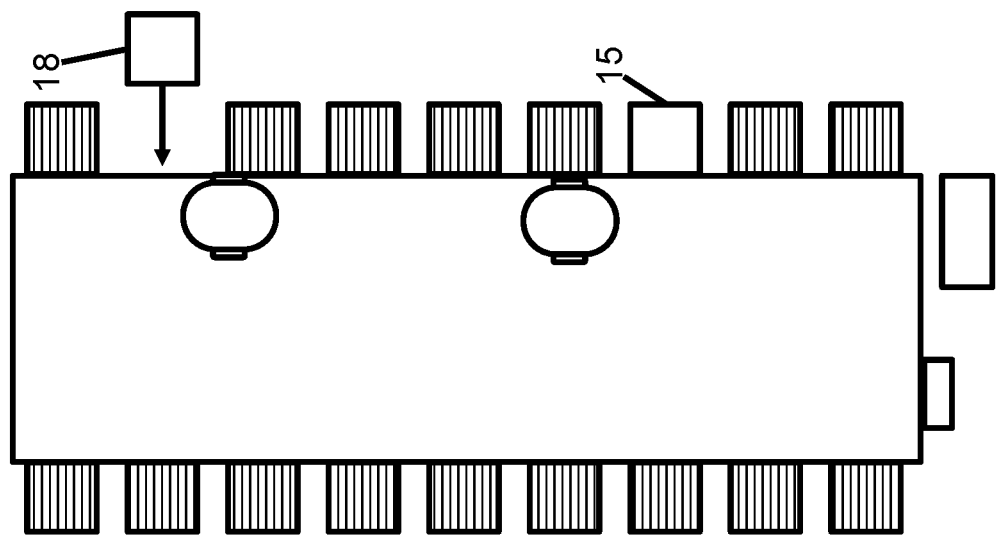
FIGS. 2A, 2B and 2C depict an example implementation of the improved sorting system for use with logical relocation of sort destinations, the system including a surface (e.g., a floor area, a platform or a level surface) for travel thereon by automated transport devices for depositing articles into destination receptacles, according to one or more implementations of the presently disclosed subject matter.
Figure 2B:
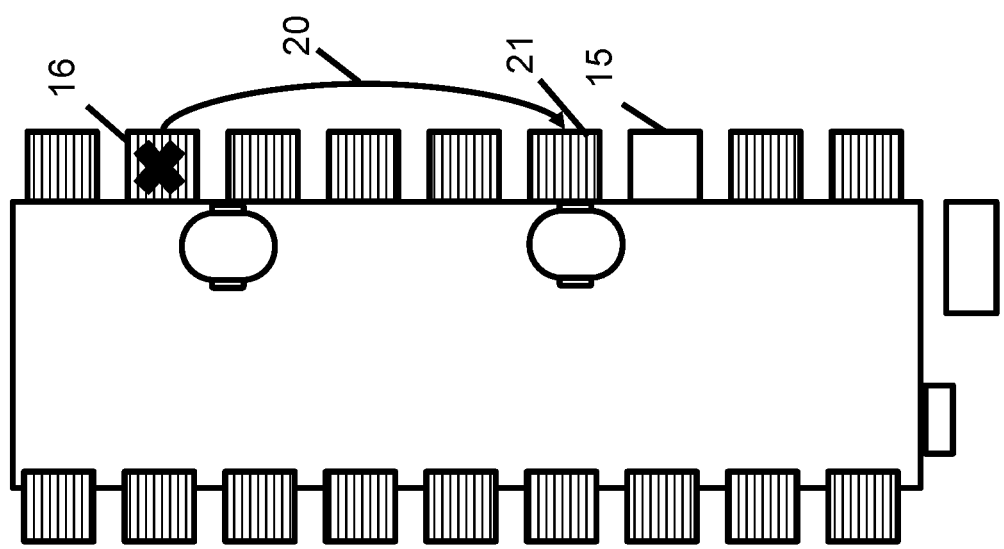
Figure 2A:
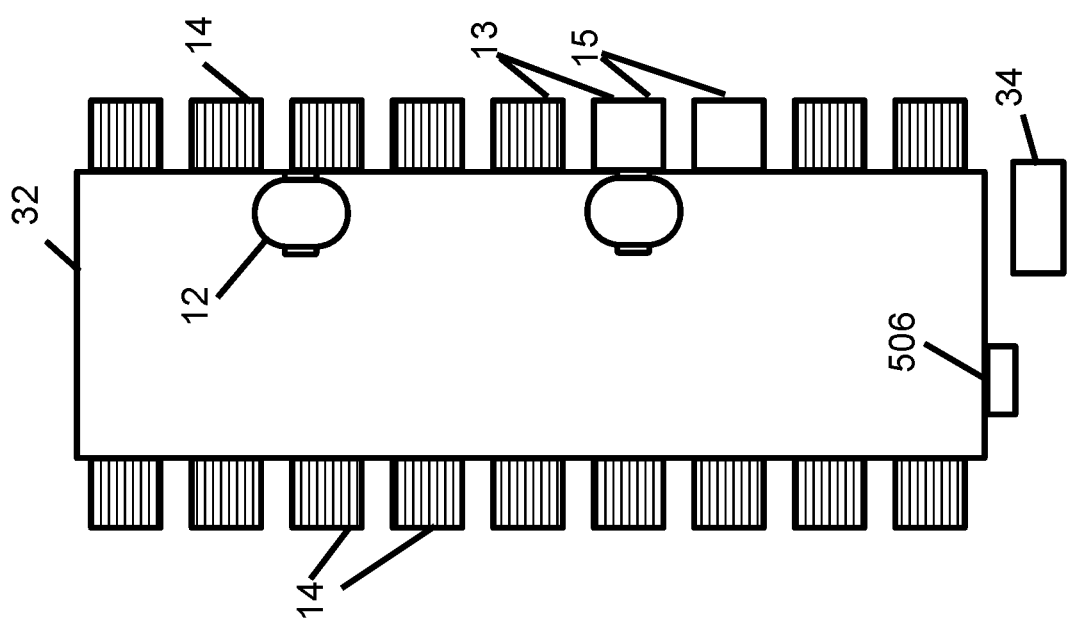

FIGS. 2A, 2B and 2C depict an example implementation of system 501 for use with logical relocation of sort destinations including a surface, floor area, or a platform for travel thereon by automated transport devices to deposit articles into receptacles, according to one or more implementations of the presently disclosed subject matter. In at least one embodiment, system 501 is configured to: assign a first logical destination ID to a first receptacle 13 (e.g., one of the assigned receptacles 14 illustrated in FIG. 2A). System 501 is further configured to direct an automated transport device to transport and deposit a first article 107 (see FIG. 3) into the first receptacle 13 (e.g., one of the assigned receptacles 14 illustrated in FIG. 2A) associated with the first logical destination ID. In FIG. 2A, assigned receptacles 14 are illustrated by squares containing several horizontal lines whereas unassigned receptacles 15 (i.e., yet to be assigned receptacles) are illustrated by empty squares (i.e., squares with no horizontal lines present within). As shown in FIG. 2B, during the sorting operations, system 501 makes a determination that one of the assigned receptacles 14 has become full (or is about to become full) whereby it is now transformed into a full receptacle 16 (see square marked within by "x" in FIG. 2B). Based on this determination, system 501 re-assigns the first logical destination ID that was originally assigned to the now full receptacle 16 to a second receptacle such as re-assigned receptacle 21 (see FIG. 2B). As a comparison of FIG. 2A and FIG. 2B makes clear, an unassigned receptacle 15 of FIG. 2A has transformed to a re-assigned receptacle 21 in FIG. 2B. In FIG. 2B, curved arrow 20 illustrates the re-assignment step. System 501 further operates to re-direct a transport device 12 carrying an article (originally meant for deposition into the now full receptacle 16 to transport) to deposit the first article 107 into the second receptacle (e.g., re-assigned receptacle 21) associated with the first logical destination ID. System 501 can further operate to coordinate the replacement of full receptacle 16 with a replacement receptacle such as replacement receptacle 18.

Accordingly, in various embodiments, system 501 operates determine that a first receptacle 13 (e.g., one of the assigned receptacles 14 illustrated in FIG. 2A) has become full whereby it now represents full receptacle 16 (see FIG. 2B); based on this determination, system 501 re-assigns the first logical destination ID to a second receptacle such as re-assigned receptacle 21. system 501 is further configured to re-direct the transport device 12 to transport and deposit the first article 107 into the second receptacle (e.g., reassigned receptacle 21) associated with the first logical destination ID.

System 501 comprises, or is in communication with, a destination information database 512. Server 502 of system 501 is configured to use data available at destination information database 512. Based on the data available at destination information database 512, server 502 is further configured to optimize the total distance that needs to be traveled by one or more transport devices to fill a particular receptacle such that the total distance traveled by all transport devices to fill that receptacle is minimized whenever possible. For example, in one implementation, a logical destination ID that is expected to receive the greatest number of articles therein is assigned to one or more receptacles that are located closest to an article induction point; this advantageously ensures that the multiple trips needed to fill a particular high demand logical destination ID involve the shortest travel durations or shortest (one-way or two-way) travel distances. Accordingly, in at least one embodiment, server 502 is configured to determine that the first receptacle is located beyond a predetermined distance from an article induction point, and based on this determination, server 502 is further configured to re-assign the first logical destination ID to a second receptacle, wherein the second receptacle is located within the predetermined (shorter) distance from the article induction point; in other words, second receptacle is located at shorter distance from the article induction point as compared to the first receptacle. For example, server 502 re-assigns the first logical destination ID to the second receptacle that is close to, or is closest to, the article induction point; accordingly, in various embodiments, the second receptacle is located within a predetermined distance from an article induction point. Server 502 is further configured to redirect a transport device 12 to transport and deposit the first article 107 into the second receptacle, for e.g., wherein the first article 107 is associated with the first logical destination ID. In one embodiment, after a transport device has left the induction point with an inducted first article 107, server 502 is configured to redirect that transport device 12 carrying an inducted first article 107 thereon to transport and deposit the first article 107 into the second receptacle 13 associated with the same first logical destination ID. Accordingly, in at least one embodiment, system 501 or server 502 is configured to re-route the automated transport device to the second receptacle after the automated transport device commences travel towards the first receptacle when (a) it is determined by system 501 or server 502 that the first receptacle is located beyond a predetermined distance from an article induction point, or (b) it is determined by system 501 or control server such as server 502 that the first receptacle 13 has become full.

According to one or more embodiments, the system is further configured to: determine that the first receptacle is located beyond a predetermined distance from an article induction point; re-assign the first logical destination ID to a second receptacle, the second receptacle representing a receptacle available that the system determines as being available for assignment and that the system further determines to be located nearest (for e.g. within a predetermined range of distance from the induction point) to the article induction point; and redirect the automated transport device to transport and deposit the first article into the second receptacle associated with the first logical destination ID. For example, in one embodiment, when the system determines that the first receptacle is located at a distance from the article induction point that is greater than an ideal (or predetermined) distance, the system searches through a database of receptacles to identify a second receptacle such that (a) the second receptacle is available for assignment (or for reassignment) such that the first logical destination ID can be assigned to the second receptacle, and (b) the second receptacle is located nearest to the article induction point. Accordingly, in this example, the second receptacle has to both be available for assignment and be located closest or nearest to the induction point. In one example, the first logical destination ID is assigned to the second receptacle that is the receptacle nearest to the induction point; in one example, the first logical destination ID is assigned to the second receptacle that is the receptacle second nearest to the induction point; in one example, the first logical destination ID is assigned to the second receptacle that is the receptacle third nearest to the induction point; in one example, the first logical destination ID is assigned to the second receptacle that is the receptacle fourth nearest to the induction point, and so on. Accordingly, in such an embodiment, the second receptacle to which the first logical destination ID is re-assigned by the system is not necessarily the nearest receptacle to the induction point; rather, the second receptacle is the one that is "available for assignment" or "available for re-assignment" of the first logical destination ID.

In various embodiment, whereas the second receptacle to which the system re-assigns the first logical destination ID to is typically closer to the induction point than the first receptacle, in the event that there is no available receptacle closer to the induction point than the first receptacle, then the system operates to search within a database to locate a next nearest available receptacle for selection to re-assign the first logical destination ID thereto; in such an embodiment the second receptacle to which the is the system re-assigns the first logical destination ID thereto is the "nearest available receptacle to the induction point".

Figure 3:
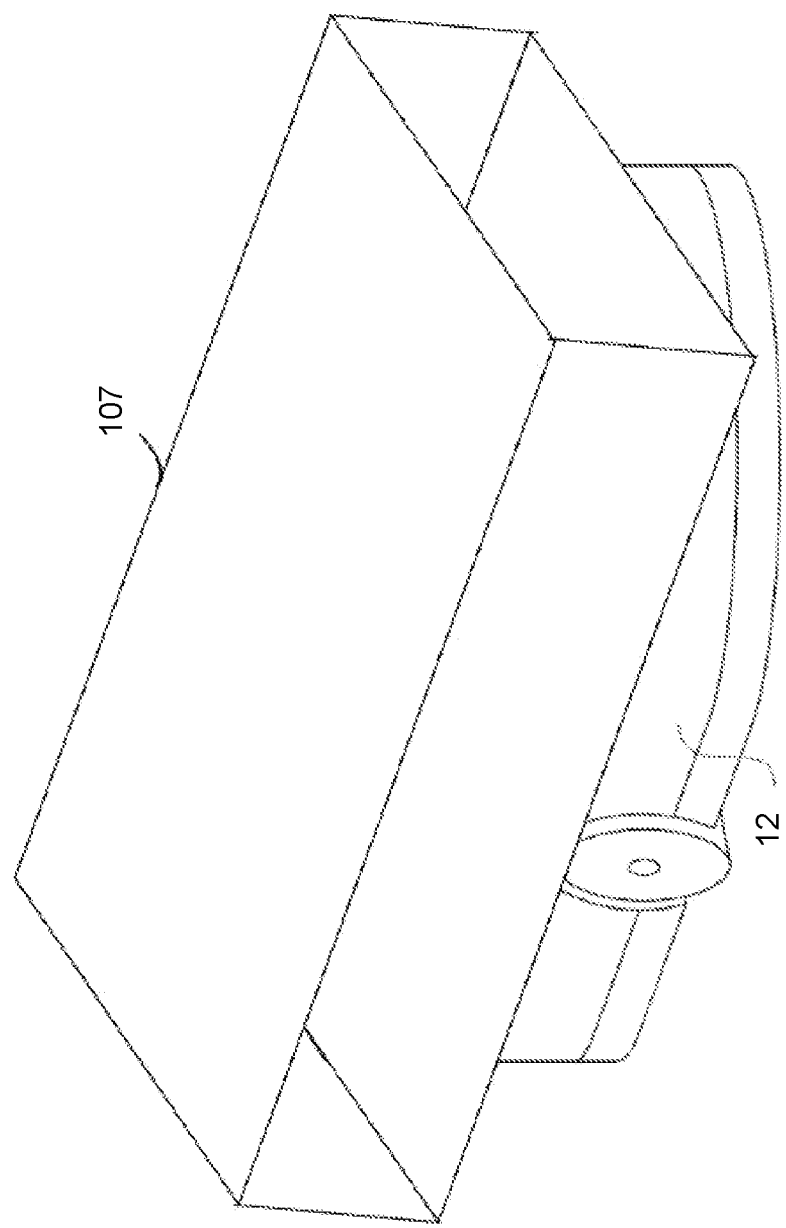
FIG. 3 depicts an example implementation of an automated transport device for carrying, moving, or transporting an article to be sorted to a destination receptacle, according to one or more implementations of the presently disclosed subject matter.

In various embodiments, transport device 12 may comprise an automated mobile robot (AMR), a computer-controlled vehicle, a track-arranged device, an overhead transport device, a pedestal robot, a personal AMR, a pick assist AMR, an automated conveyor system, or any similar automated transport or transfer device. In at least one embodiment, transport device 12 traverses a first surface, floor area, platform or a track arrangement. In some embodiments, transport device 12 may comprise a conveyor. FIG. 3 depicts an example automated transport device such as transport device 12 for carrying, moving, or transporting an article such as first article 107 to be sorted to a receptacle.

In various embodiments, when server 502 determines that a first receptacle is full or is about to become full thereby resulting in a full receptacle 16 as shown in FIG. 2B, server 502 is further configured to direct replacement of the full receptacle 16 (i.e., receptacle 13 that is full) with a replacement receptacle 18 (replacement receptacle 18 is shown in FIG. 3C). In at least one embodiment, after replacement receptacle 18 is properly positioned in an article receiving position proximal surface 32 such that it is ready to receive articles, server 502 is configured to receive confirmation of this. Server 502 is accordingly further configured to receive confirmation of the replacement of the first receptacle with an empty receptacle. In some embodiments, server 502 is in communication with a sensing device configured to sense that the empty receptacle is ready to receive articles. In various embodiments, system 501 is further configured to verify that there is at least one non-full receptacle available for delivery of articles thereto, and when this is not the case, server 502 operates to notify a human operator of the same. In at least one embodiment, a receptacle 13 has become full (whereby it is now full receptacle 16 shown in FIG. 2B), server 502 directs a robot or an automated device to transport full receptacle 16 to a location of further processing from its article receiving position that is proximal surface 32. In some embodiments, the full receptacle 16 is removed manually.

Figure 4:
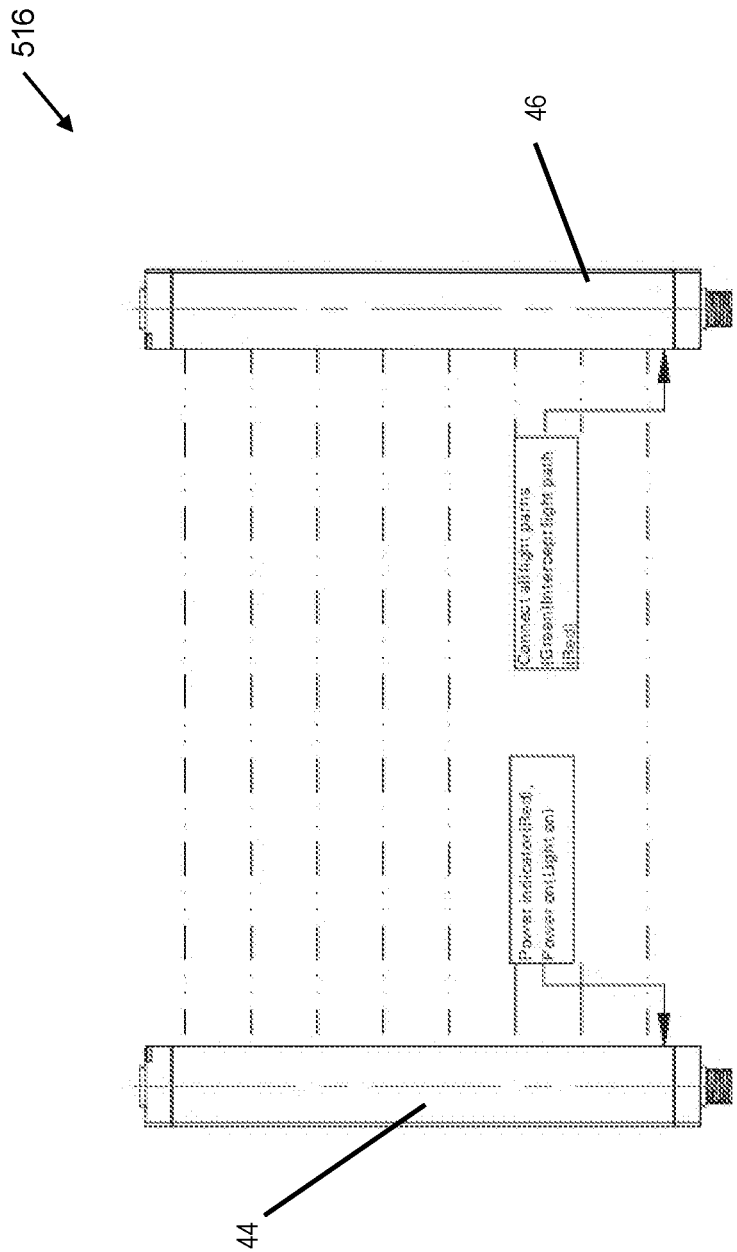
FIG. 4 depicts an example implementation of a sensor that senses that a destination receptacle has become full, according to one or more implementations of the presently disclosed subject matter.

In various embodiments, server 502 is in communication with sensing device 516 configured to sense if and when a receptacle is full or is about to become full. FIG. 4 illustrates one embodiment of sensing device 516 in the form of a light curtain set-up, wherein sensing device 516 includes an emitter pylon 44 and a receiver pylon 46, as is well understood by a person of skill in the art. Sensing device 516 operates to sense that a receptacle has become full or is about to become full. In various embodiments, sensing device 516 is in two-way communication with server 502.

Figure 6:
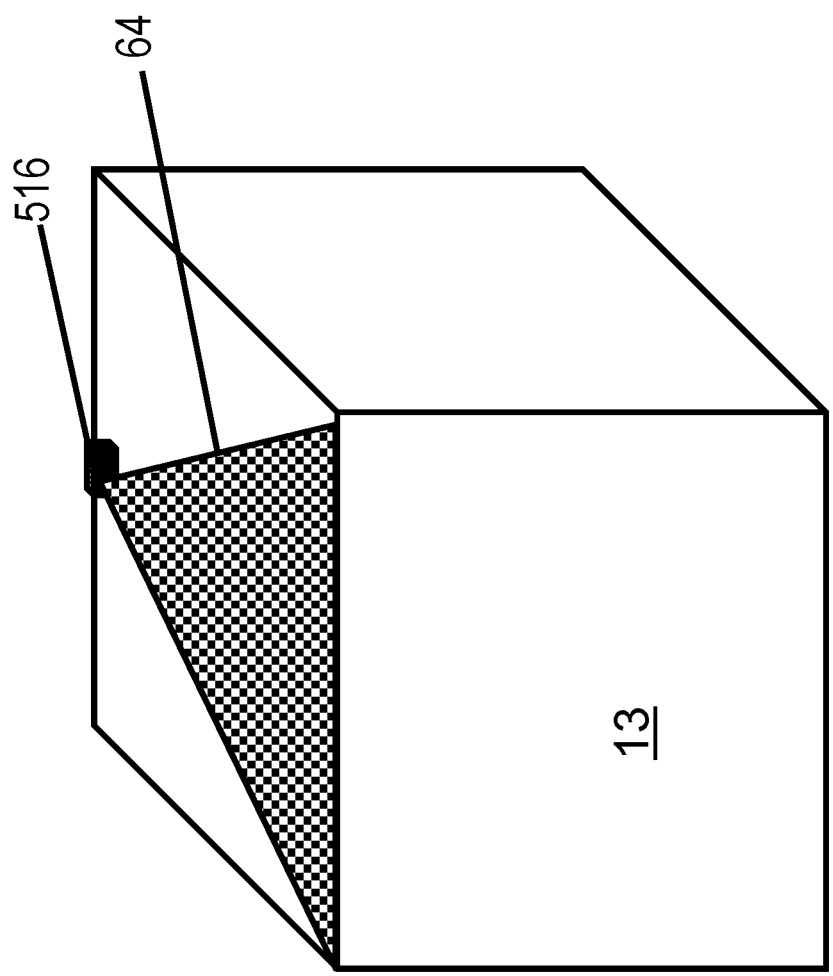
FIG. 6 depicts an example implementation of an optical sensor such as, for e.g., a photo eye, that senses that a destination receptacle has become full, according to one or more implementations of the presently disclosed subject matter.

FIG. 6 illustrates another embodiment of sensing device 516 in the form of an optical sensor such as, for e.g., a photo eye. Sensing device 516 in the form of an optical sensor shown in FIG. 6 includes a field of vision 64 that the sensing device 516 utilizes to determine that a destination receptacle such as receptacle 13 has become full, according to one or more implementations of the presently disclosed subject matter. In one embodiment, when the field of vision 64 indicates that the receptacle 13 is 75%, 80%, 85%, 90%, 95% or 99% full, server 502 is in communication with sensing device 516 senses that receptacle 13 is full or is about to become full.

Figure 5:
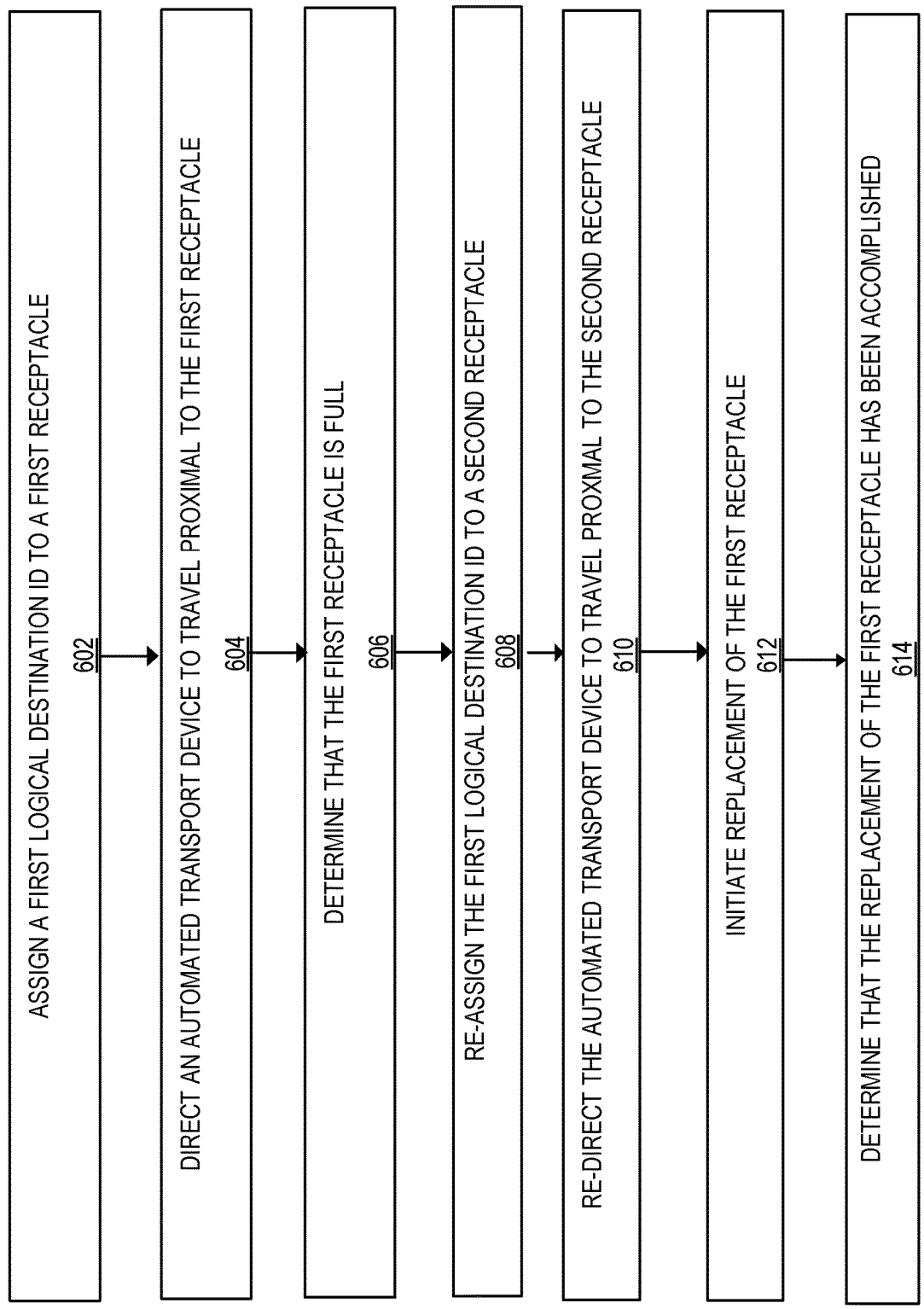
FIG. 5 depicts an exemplary flowchart of an exemplary implementation of an improved sorting system for use with logical relocation of sort destinations, according to one or more implementations of the presently disclosed subject matter.

FIG. 5 depicts an exemplary flowchart of an exemplary implementation of an improved sorting system for use with logical relocation of sort destinations, according to one or more implementations of the presently disclosed subject matter. FIG. 5 accordingly depicts a flowchart of an exemplary process corresponding to system 501. The exemplary process shown in FIG. 5 may be implemented, for example, by server 502. Referring to FIG. 5, at step 602, a first logical destination ID is assigned to a first receptacle, for e.g., by server 502. At step 604, an automated transport device is directed, for e.g., by server 502, to travel proximal to the first receptacle. At step 606, a determination is made, for e.g., by server 502, that the first receptacle is full. At step 608, the first logical destination ID is re-assigned, for e.g., by server 502, to a second receptacle. At step 610, the automated transport device is re-directed, for e.g., by server 502, to travel proximal to the second receptacle to deposit the article carried on the automated transport device into the second receptacle. At step 612, the replacement of the full first receptacle is initiated, for e.g., by server 502. At step 614, a determination is made, for e.g., by server 502, that the replacement of the first receptacle with a replacement receptacle has been accomplished or completed.

In various embodiments, system 501 (or server 502) operates to maintain the count of the physical locations and/or the count of the receptacles to be greater than a count of the logical destination IDs. In some embodiments wherein a count of the physical locations is greater than a count of the logical destination IDs, a difference between the count of the physical locations and the count of the logical destination IDs is determined based on a time interval required for replacing a full receptacle with an empty receptacle. In some embodiments, system 501 is further configured to assign a logical destination ID to each of the plurality of receptacles. In some embodiments, system 501 further comprises an article information acquisition device 506 electronically coupled to server 502, wherein the article information acquisition device 506 is configured to determine a product type of each article by interacting with each article. In various embodiments, server 502 is further configured to calculate a total volume of articles delivered or deposited by transport device 12 to the first receptacle 13;

server 502 additionally has access to the total volume of the first receptacle 13 whereby server 502 can determine, calculate or estimate the time instant when the first receptacle is full or is about to get full.

In one embodiment, system 501 operates to calculate the minimum number of available or unassigned or "spare" physical locations required using the formula: (time required to replace a receptacle)/(time period between receptacles filling). As an illustrative example, if the time interval or time duration to replace a full receptacle with an empty receptacle is 2 minutes, and the sorting system completes the filling of one receptacle every 1 minute, and then system 501 calculates that it will need 2/1=2 more physical destinations than logical destinations; in other words, system 501 calculates that it needs two spare physical locations.

In various embodiments, the time interval to replace a receptacle varies, for e.g., during peak time operations. Accordingly, in one example, the time interval required to replace a receptacle, for e.g., during peak times, equals 3 minutes. Since a typical system rarely completes filling of receptacles at a consistent rate, in one example, system 501 uses the assumption that during peak times a receptacle gets filled out every 30 seconds. In such a case, 3 minutes/30 seconds=6 spare physical locations are required. Accordingly in one example, system 501 with 200 logical destinations calculates that it will require 6 spare physical locations to thereby yield a total of 206 physical locations such that there are not unplanned delays in the sorting operations.

In one implementation, system 501 carries out sortation operations using autonomous mobile robots (AMRs). In this implementation, a given AMR has been routed to a receptacle and the system recognizes that the receptacle is full. AMRs which are enroute to a destination receptacle which gets filled up after an AMR has been dispatched by the system to deliver an article to closes, the AMR is re-routed to the new destination. The event of a destination receptacle being filled up can be determined by a sensor at the location that communicates this information to server 502, or by server 502 that calculates the total cubic volume or total weight of all of the articles sorted into that destination receptacle, or by the fact that an order assigned to that destination receptacle has been completed. Server 502 then re-assigns the logical destination to a new physical location. Server 502 re-routes any enroute vehicles from the filled location to the new location. Any subsequent articles destined for the current logical destination are routed to the new physical location. The server initiates or directs the change-out of the full receptacle. This initiation may be in the form of a message to another system that controls the change-out robots, or in the form of an indication to a human operator via lights, sounds, signals sent to a handheld computer, etc. When the change-out is complete, the change-out automation or a human operator may send a confirmatory message to the server information that the location is available for another logical destination to be assigned.

The embodiments disclosed herein may be advantageous to AMR sorters as compared to other types of automated sorters because AMRs can be re-routed. A track-based sorter can also take advantage of logical destinations; however, such a sorter may need to recirculate around the sorter when a physical destination changes; if the article has not yet reached the new physical location when there is a location re-assignment, then it need not recirculate.

The input article region 34 (see FIG. 2A) functions to hold articles prior to sorting. In one variation, the input article region 34 includes one or more input article holders that contain unsorted articles. The article holders can be placed adjacent to article information acquisition device 506 and are preferably within the reachable range of article information acquisition device 506. In this way, a worker, conveyor system, or a robotic system may move an article holder into position and optionally remove empty (or otherwise finished) article holders present at input article region 34. Articles and/or article holders may be moved through or added to the input article region 34 using a conveyor, a chute, an autonomous mobile robot, or using any suitable mechanism.

In one variation, the articles may be supplied without article identification and so the system can facilitate determining an article identifier (or some other property) that can be used in selecting a destination receptacle 13 among a plurality of receptacles 13 for the article. In another variation, article input may be configured such that one or more articles may be supplied such that an article identifier (or property) is known when article information acquisition device 506 interacts with the article and thereby a receptacle 13 may be associated with the article prior to placement of the article on a transport device 12. In such a variation, the order of article selection by system 501 may factor in the capacity levels of receptacles such that an article is dispatched after server 502 makes a determination that an associated receptacle 13 has capacity to receive the article.

Article information acquisition device 506 includes one or more sensors for article identification. This could include a sensor for scanning a barcode and/or an RFID tag reader. In one exemplary implementation, system 501 may include 4 barcode scanners: two side scanners, one top scanner, and a bottom scanner. The two side barcode scanners can capture barcodes on the sides of articles while rotating the article. The top scanner can capture barcodes from up top such as after article placement in a transfer tray or the article tray. The bottom scanner can capture barcodes from below as the article is removed from the article receptacle. A transparent shield can be placed above the bottom scanner so that if an article is dropped it will deflect off the shield. Any suitable sensing system may be used for collecting information of an article that can be used to determine a destination output receptacle.

Article information acquisition device 506 may further function to collect data of the objects and the environment. In one embodiment, article information acquisition device 506 includes an imaging system, which functions to collect image data. The imaging system can include at least one imaging device with a field of view of a region of interest that covers a region where the article is transferred to a transport device 12 and the input article region 34. The imaging system may additionally include multiple imaging devices used to collect image data from multiple perspectives of a distinct region, overlapping regions, and/or distinct non-overlapping regions. The set of imaging devices (e.g., one imaging device or a plurality of imaging devices) may include a visual imaging device (e.g., a camera). The set of imaging devices may additionally or alternatively include other types of imaging devices such as a depth camera. Other suitable types of imaging devices may additionally or alternatively be used. Article information acquisition device 506 may collect data that is communicated to the server 502 to facilitate article placement onto a transport device. For example, image data of a collection of articles in the input article region 34 can be processed by an analysis model that outputs one or more sortation plans (e.g., points for article selection, or motion plans for approaching, and picking up an article).

Article information acquisition device 506 may additionally or alternatively include one or more sensors for article dimensioning. Article information acquisition device 506 could include one or more dimensional camera (e.g., a depth sensor) or similar other sensor system for dimensioning the article. Dimensioning can include determining spatial characteristics of the article (i.e., article dimensions). In one implementation the article dimensions can include defining a bounding volume of the article (e.g., a width, height, and depth of the article). The article dimensions may be used at least in part in planning placement orientation during induction and sortation into a receptacle 13. Other sensors such as load cells, proximity sensors, RFID tracking systems, and the like may also be used to monitor status of various aspects of system 501. System 501 may additionally include other supplementary systems such as, for e.g., label printer and applicator, which function to enable labels to be produced and applied to an article prior to sortation.

System 501 may additionally include an optional receptacle capacity sensor that functions to measure the capacity level of an article receptacle and/or to detect when an article receptacle is at proximity. A variety of sensor mechanisms may be used. In one implementation, a depth sensor or an imaging system can be downwardly attached to surface 32. The depth sensor can detect or collect image data used in predicting the capacity level of an article receptacle as it passes over the article receptacles. The capacity of an article receptacle may be measured each time an article is deposited into it. The receptacle capacity sensor is in one-or two-way communication with server 502. In one variation, the output receptacle capacity sensor is coupled to surface 32 or to transport device 12 such that the output receptacle capacity sensor can be moved across an array of receptacles 13. The capacity of a receptacle 13 may be measured as the capacity sensor passes over a receptacle during use of the transport device 12 such as when in transit and/or while depositing an article. Further, surface 32 may be equipped with sensors or other elements that can act on an article being sorted. In particular, surface 32 could include a weight sensor so that articles could be weighed prior to being transferred to a transport device. In one example, the weight sensor could be a load cell (or other sort of pressure sensor, strain sensor, digital scale, or the like to estimate/measure weight) integrated into a transfer tray.

In one implementation, article information acquisition device 506 interacting with the article can include determining an identifier of the article. This may be used when information concerning the identity of the article is unknown prior to picking the article. Accordingly, the article may be scanned or imaged to determine a designated grouping. For example, for parcels, an address may be scanned and used for determining which route group to use for the parcel. Determining an identifier of the article may include scanning a barcode (or other suitable type of machine-readable code or information), reading an RFID tag, or reading another type of wireless identifier signal, visually classifying the article using computer vision analysis, and/or using some other identification or classification technique.

After determining the identifier of the article, the system may determine a targeted article receptacle of the article based on the identifier of the article. In other words, an article can be picked and scanned to determine its identity, and then based on the identity query a database to determine which one or more targeted article receptacle to associate with the article. The system can then facilitate sorting the article into the targeted article receptacle such as receptacle 13.

According to at least one embodiment, server 502 operates to manage the sort destinations using at least 3 main parameters or fields: receptacles, physical locations, and logical destinations. In one embodiment, each receptacle is assigned to a physical location, and then each logical destination is assigned to the physical location; accordingly, in this embodiment, the logical destination ID is not assigned directly to a receptacle.

In various embodiments, the logical destination ID may represent: an order, a store, a shipping route, carrier, zip code, city, and a similar other characteristic. In at least one embodiment, there are multiple receptacles associated with one destination ID, e.g., when a store order requires more than will fit in one receptacle. Accordingly, in at least one embodiment, server 502 uses physical locations (rather than receptacles) to sort articles and to direct transport device 12 for sorting articles into receptacles. Accordingly, in various embodiments, system 501 requires more physical locations than logical destinations. Indeed, in at least one embodiment, it is advantageous for system 501 to include more physical locations than logical destinations rather than to include more receptacles than logical destinations.

According to one or more embodiments, the automated transport device is an automated mobile robot (AMR) or a computer-controlled vehicle. According to one or more embodiments, the server is configured to re-route the automated transport device to the second receptacle after the automated transport device commences travel towards the first receptacle. According to one or more embodiments, the second receptacle is located within a predetermined distance from an article induction point. According to one or more embodiments, the server is further configured to direct replacement of the first receptacle. According to one or more embodiments, the server is further configured to receive confirmation of replacement of the first receptacle with an empty receptacle. According to one or more embodiments, the server is in communication with a sensing device configured to sense that the empty receptacle is ready to receive articles. According to one or more embodiments, a robot is configured to transport the first receptacle to a location of further processing. According to one or more embodiments, the first receptacle is removed manually. According to one or more embodiments, the server is in communication with a sensing device configured to sense that the first receptacle is full. According to one or more embodiments, the server is further configured to calculate a total volume of articles delivered by the automated transport device to the first receptacle to determine that the first receptacle is full. According to various embodiments, a count of the physical locations is greater than a count of the logical destination IDs. In one embodiment, a count of the receptacles or a count of physical locations associated with the receptacles is greater than a count of the logical destination IDs. In one embodiment, a count of physical locations associated with the receptacles is greater than a count of the logical destination IDs, wherein a difference between the count of the physical locations and the count of the logical destination IDs is determined based on a time interval required for replacing a full receptacle with an empty receptacle. In one embodiment, the count of receptacles is equal to or greater than the count of physical locations. In at least one embodiment, each physical location corresponds to a physical address to which a group of the sorted articles (that have been sorted, for e.g., to a receptacle or to two or more receptacles in case all articles to be sorted to that specific physical address will not fit onto one receptacle) are to be shipped. Accordingly, it is advantageous for system 501 to include more physical locations than logical destinations rather than to include more receptacles than logical destinations. In one embodiment, a count of the receptacles is greater than a count of the logical destination IDs. According to one or more embodiments, a count of the physical locations is greater than a count of the logical destination IDs, wherein a difference between the count of the physical locations (or the count of receptacles) and the count of the logical destination IDs is determined based on a time interval required for replacing a full receptacle with an empty receptacle. According to one or more embodiments, a sensing device in communication with the server senses that the first receptacle is full. According to one or more embodiments, the transport device traverses one of: a first surface and a track arrangement. According to one or more embodiments, the system is further configured to assign a logical destination ID to each of the plurality of receptacles. According to one or more embodiments, the system further comprises an information acquisition device electronically coupled to the server, wherein the information acquisition device is configured to determine a product type of each article by interacting with each article. According to one or more embodiments, the system is further configured to verify that there is at least one non-full receptacle available for delivery of articles thereto.

In another variation, processing of the article to be sorted before placement on a transport device can include determining dimensional properties of the article, which functions to sense or detect one or more dimensions of the article. In one variation, determining dimensional properties of the article can include determining a bounding volume of the article (e.g., height, width, and depth). In another variation, determining dimensional properties of the article may include collecting a full or partial 3D scan of the surface of the article. Determining dimensional properties can include sensing one or more dimensional metrics of the article. This may involve moving the article in range of a dimensional camera or other sensing system. This may additionally include manipulating the article within the view of a sensor for scanning different views of the article. In addition to sensing dimensions, image data may be used to predict dimensions and/or form of the object using an AI (artificial intelligence) classifier model or other technique.

The dimensional properties may be used for any suitable purpose, but in one particular variation, the dimensional properties may be used in predicting a placement orientation of the article for depositing into an article receptacle. In other words, the dimensions and/or shape of the article can be used for figuring out how the article may be best placed in an article tray of an article sortation unit so that when it deposits the article into an article receptacle it has high confidence for successful depositing. This can avoid situations where articles of more irregular forms could flip over and miss an article receptacle. In one example, the dimensional properties of the article can be used in determining if an article is larger in one or more axes than the container opening and then orienting the article such that when deposited the object enters an article receptacle with a side with dimensions that do fit within a defined opening of the article receptacle.

Herein, reference made to "articles" characterizes the objects subjected to sortation by a sorting system. An article can be any suitable type of object such as a package, a parcel, a product, raw material good (e.g., a manufactured part), and/or any suitable type of object that needs sortation organization. In the case of shipping or other operational contexts, an article may have various properties. In a parcel processing center, articles could be, for example: boxed goods, bagged goods, and/or parcels. An article could have destination information indicating where it should be shipped. An article could have an article type information that could correspond to a stock keeping unit (SKU) identifier or an alternative product identifier.

Herein, reference is also made to receptacles such as receptacle 13, which is used to characterize the receptacle used to hold articles once sorted. The form factor and variety of the receptacles can vary greatly, and the system may be adapted to different types of receptacles such as boxes, receptacles, trays, bags, gaylords, and the like. Article receptacles may use any suitable form factor and, in some cases, may use the same type of container. In some variations, the form factor may be customized for particular variations and implementations of system 501 as described herein.

In some implementations, one or more components such as receptacle logical ID assignment engine 508 and destination information database 512 may reside external to server 502 but nonetheless in communication with server 502. System 501 further comprises or is in communication with sensing devices 516, transport devices 12, and one or more receptacles 13. System 501 includes additional components such as article information acquisition device 506 (e.g., a scanner, an image capturing equipment, and similar other equipment), and a wireless access point 514, among others. System 501 further comprises one or more surfaces 32, as shown in FIG. 2. System 501 further includes one or more receptacles 13, wherein system 501 operates to sort a plurality of articles to a receptacle 13, the plurality of articles comprising a first article 107.

In various embodiments, server 502 is a control server that is configured for communicating with one or more components of system 501 as described herein, and as shown, for example, in FIG. 1. In one implementation, server 502 includes memory, a processor, and/or one or more communication interfaces communicatively coupled to each other. A network may form part of system 501, wherein the network may take on any appropriate form, including a wireless network such as Wi-Fi, cellular, or other frequency bands for private use, or a hard-wired network such as LAN, WAN, internet, etc., and combinations thereof. In one implementation, server 502 may communicate over the network with the cloud. In some implementations, one or more components of server 502 may reside in the cloud. Similarly, several of the components such as, for example, article information acquisition device 506, wireless access point 514, computer-controlled or automated transport devices 12 and server 502 may communicate over the network with the cloud. In some implementations, one or more components of system 501 may reside in the cloud. For example, in one implementation, server 502 may reside in the cloud. In at least one implementation, server 502 may be in communication with one or more third-party servers, such as warehouse management system servers and automated transport device operations control servers.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various implementations, server 502 can be or can otherwise include a server as the term "server" is understood in its broadest sense. The term "server" as used herein includes any computer that provides data to other computers. It may serve data to systems on a local area network (LAN) or a wide area network (WAN) over the Internet. In various implementations, server 502 can be or can include a cloud server. The term "cloud server" as used herein includes any pooled, centralized server resource that is hosted and delivered over a network—typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions as a traditional physical server including delivering processing power, storage, and applications. One of the advantages of cloud storage is that there are many distributed resources acting as one-often called federated storage clouds. This makes the cloud very tolerant of faults, due to the distribution of data. Use of the cloud can reduce the creation of different versions of files, due to shared access to documents, files, and data.

Each of the components shown or mentioned in FIGS. 1-5 may be in communication with one or more other components through a wired and/or a wireless network. For example, the cloud, the server 502 may further communicate with receptacles 13, receptacle logical ID assignment engine 508, sensing devices 516, article information acquisition devices 506, automated transport devices 12, destination information database 512, and wireless access point 514 over a network.

A person of ordinary skill in the art would understand that the implementations described in this application are examples, and that the scope of this application is not limited by these examples or implementations. For instance, while the preferred implementation relates to sorting robots, the apparatus and method described herein would apply equally well to any automated transport device set up meant for transporting or transferring articles of disparate sizes. For instance, the disclosed apparatus and method would also be applicable for pick assist robot applications. Similarly, the disclosure here is also relevant to lifting robots and several other types of robots used in warehouse and material handling facility applications.

In one exemplary application, system 501 can be used for consolidating parcels for shipping. For example, a parcel processing site may use system 501 to sort parcels by destinations (e.g., zip codes or delivery routes) for subsequent shipment processing. Unsorted letters and/or packages can be collected into large article receptacles and then system 501 can facilitate sorting those into smaller article receptacles for different delivery routes/destinations. There is a high need for compact and modular sortation of articles beyond parcels though and system 501 can similarly be applied to those applications.

In another exemplary application, system 501 can be used for returned good processing and/or good restocking. For example, mixed article receptacles of returned goods could be appropriately sorted for resheling, restocking, or other subsequent processing. In another example, newly received article orders could be sorted into appropriate receptacles for replenishing article stock within a store. The size and automated affordances of system 501 is such that it could be used in a variety of environments such as in a back-warehouse of a retail store or in an order fulfillment center (e.g., such as for ecommerce returns).

In another exemplary application, system 501 may be used for order fulfillment where a collection of articles is sorted into individual article receptacles, where each article receptacle may be associated with a particular order. In some embodiments, the orders may be, for e.g., for consumers such as ecommerce orders; in at least one example, the orders represent commercial orders for delivery to a business. In a similar manner, system 501 may also be used for dynamic or custom kitting for industrial or consumer goods.

In a fully autonomous implementation of the system, the article receptacles may be attached to an automated conveyor system or other translation devices such that the article receptacles can be removed in an automated fashion. Similarly, empty (or at least not full) article receptacles may be moved into an unfilled region of the article receptacle array. In one implementation an autonomous robot, pallet jack or tug may engage with article receptacles when at capacity and remove them from the article receptacle array. Similarly, new article receptacles can be automatically inserted into a non-filled article receptacle space.

In a semi-automated system, signaling changing of an article receptacle may include triggering an alert and indicating the article receptacle(s) to be removed. The alert may similarly indicate the assigned grouping and the next task for the article receptacle. This may alert human workers that can manually or through the aid of some mechanism remove an article receptacle and/or load an article receptacle.

Article receptacles are generally signaled for discharging (using an autonomous or semi-autonomous approach) when the article receptacle satisfies a capacity condition. The capacity condition may be based on how full the article receptacle is or whether an order has been completed. However, the method can additionally model expected time and availability to exchange an article receptacle. For example, an article receptacle may be removed before it is at a capacity limit to avoid having too many article receptacles needing exchange at the same time. As another condition, an article receptacle may be discharged when the method determines a benefit to having a different mix of groupings allocated within the receptacle array. For example, an uncommon article receptacle may be discharged when it has few articles such that a new article receptacle placed in that position can be reassigned to a different grouping.

System 501 may accordingly provide a number of potential benefits. System 501 is not limited to always providing such benefits and are presented only as exemplary representations of how system 501 may be put to use. The list of benefits is not intended to be exhaustive and other benefits may additionally or alternatively exist.

A person of ordinary skill in the art would understand that the embodiments described in this application are examples, and that the scope of this application is not limited by these examples or embodiments. For instance, while the preferred embodiment relates to order sorting in a warehouse or industrial facility, the apparatus and method described herein would apply equally well to any material handling environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment comprising software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM [erasable programmable read-only memory] or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A system for use in directing a sorting operation, the system comprising:
    a server comprising a memory, a processor, and a receptacle logical destination identification (ID) assignment engine;
    a plurality of receptacles; and
    an automated transport device for transporting and depositing articles into the receptacles; and
    wherein the system is configured to:
        assign a plurality of logical destination IDs to the plurality of receptacles such that a count of the plurality of receptacles is greater than a count of the logical destination IDs; and
        direct an automated transport device to transport and deposit a first article into a first receptacle, wherein the first receptacle is associated with a first logical destination ID among the plurality of logical destination IDs.

2. The system of claim 1, the system is further configured to:
    determine that the first receptacle is full;
    re-assign the first logical destination ID to a second receptacle; and
    re-direct the automated transport device to transport and deposit the first article into the second receptacle associated with the first logical destination ID.

3. The system of claim 1, the system is further configured to:
    determine that the first receptacle is located beyond a predetermined distance from an article induction point;
    re-assign the first logical destination ID to a second receptacle, wherein the second receptacle is located within the predetermined distance from the article induction point; and
    redirect the automated transport device to transport and deposit the first article into the second receptacle associated with the first logical destination ID.

4. The system of claim 1, wherein the automated transport device is an automated mobile robot (AMR) or a computer-controlled vehicle.

5. The system of claim 2, wherein the server is configured to re-route the automated transport device to the second receptacle after the automated transport device commences travel towards the first receptacle.

6. The system of claim 2, wherein the second receptacle is located within a predetermined distance from an article induction point.

7. The system of claim 2, wherein the server is further configured to direct replacement of the first receptacle.

8. The system of claim 7, wherein the server is further configured to receive confirmation of replacement of the first receptacle with an empty receptacle.

9. The system of claim 8, wherein the server is in communication with a sensing device configured to sense that the empty receptacle is ready to receive articles.

10. The system of claim 7, wherein a robot is configured to transport the first receptacle to a location of further processing.

11. The system of claim 7, wherein the first receptacle is removed manually.

12. The system of claim 1, wherein the server is in communication with a sensing device configured to sense that the first receptacle is full.

13. The system of claim 1, wherein the server is further configured to calculate a total volume of articles delivered by the automated transport device to the first receptacle to determine that the first receptacle is full.

14. The system of claim 1, wherein the server is further configured to calculate a difference between the count of the plurality of receptacles and the count of the logical destination IDs based on a time interval required for replacing a full receptacle with an empty receptacle.

15. The system of claim 1,
    wherein a count of physical locations associated with the receptacles is greater than a count of the logical destination IDs,
    wherein a difference between the count of the physical locations and the count of the logical destination IDs is determined based on a time interval required for replacing a full receptacle with an empty receptacle.

16. The system of claim 1, wherein a sensing device in communication with the server senses that the first receptacle is full.

17. The system of claim 1, the system is further configured to:
    determine that the first receptacle is located beyond a predetermined distance from an article induction point;
    re-assign the first logical destination ID to a second receptacle, the second receptacle representing a receptacle available for assignment that is located nearest to the article induction point; and redirect the automated transport device to transport and deposit the first article into the second receptacle associated with the first logical destination ID.

18. The system of claim 1, wherein the system is further configured to assign a logical destination ID to each of the plurality of receptacles.

19. The system of claim 1, wherein the system further comprises an information acquisition device electronically coupled to the server, wherein the information acquisition device is configured to determine a product type of each article by interacting with each article.

20. The system of claim 1, wherein the system is further configured to verify that there is at least one non-full receptacle available for delivery of articles thereto.

* * * * *